United States Patent
Co et al.

(10) Patent No.: US 6,396,841 B1
(45) Date of Patent: May 28, 2002

(54) DUAL-SPEED STACKABLE REPEATER WITH INTERNAL BRIDGE FOR CASCADING OR SPEED-LINKING

(75) Inventors: Ramon S. Co, Trabuco Canyon; Daniel Hsu, Fountain Valley, both of CA (US)

(73) Assignee: Kingston Technology Co., Fountain Valley, CA (US)

( * ) Notice: Subject to any disclaimer, the term of this patent is extended or adjusted under 35 U.S.C. 154(b) by 0 days.

(21) Appl. No.: 09/103,337

(22) Filed: Jun. 23, 1998

(51) Int. Cl.[7] ............................................. H04L 12/28
(52) U.S. Cl. ..................... 370/401; 370/438; 370/445; 370/501; 375/211; 375/356
(58) Field of Search ................. 370/401, 402, 370/407, 425, 438, 445, 461, 492, 501, 246, 451, 351, 410, 463, 465; 375/211, 212, 257, 358, 356, 213

(56) References Cited

U.S. PATENT DOCUMENTS

| | | | |
|---|---|---|---|
| 5,432,907 A | 7/1995 | Picazo, Jr. et al. | 395/200 |
| 5,517,520 A | 5/1996 | Chi | 375/212 |
| 5,557,633 A | 9/1996 | Staab et al. | 375/214 |
| 5,596,575 A | 1/1997 | Yang et al. | 370/468 |
| 5,648,959 A | 7/1997 | Ilyadis et al. | 370/445 |
| 5,682,383 A | 10/1997 | Dahod et al. | 370/364 |
| 5,720,032 A | 2/1998 | Picazp, Jr. et al. | 395/200.2 |
| 5,740,174 A * | 4/1998 | Somer | 370/402 |
| 5,742,602 A | 4/1998 | Bennett | 370/401 |
| 5,742,603 A | 4/1998 | Shafir et al. | 370/401 |
| 5,754,552 A * | 5/1998 | Allmond et al. | 370/465 |
| 5,777,996 A * | 7/1998 | Chan et al. | 370/402 |
| 6,041,065 A * | 3/2000 | Melvin | 370/492 |
| 6,055,241 A * | 4/2000 | Raza et al. | 370/445 |
| 6,055,267 A * | 4/2000 | Chiou | 375/211 |
| 6,097,738 A * | 8/2000 | Talaat et al. | 370/492 |
| 6,178,176 B1 * | 1/2001 | Voloshin et al. | 370/438 |
| 6,195,360 B1 * | 2/2001 | Raza et al. | 370/407 |
| 6,240,101 B1 * | 5/2001 | Co et al. | 370/461 |

* cited by examiner

*Primary Examiner*—Huy D. Vu
*Assistant Examiner*—M. Phan
(74) *Attorney, Agent, or Firm*—Stuart T. Auvinen

(57) ABSTRACT

Repeater units in a stack are identical. Each repeater unit has an internal repeater and an internal bridge. The repeater stack is dual-speed, with each repeater connecting to a 10 Mbps (10M) backplane bus and to a 100 Mbps (100M) backplane bus in the stack's chassis. The internal repeater has a 10M repeater circuit that connects 10M ports to the 10M bus, and a 100M repeater circuit that connects 100M ports to the 100M bus. Ports are configured for either 10M or 100M operation. Data from 10M ports is repeated to all other 10M ports and to the 10M bus, but not to 100M ports or the 100M bus. Instead, a 10M port is connected to the internal bridge, which is also connected to a 100M port. The internal bridge stores and forwards packets to and from the 10M port and the 100M port. Only one internal bridge in the stack is configured to link the 10M and 100M ports. Other internal bridges are configured to connect a cascading port to the internal repeater. The cascading port is buffered by the internal bridge. This buffering allows external repeaters to be cascaded without regard to the repeater limit. Repeater units in the stack can be automatically configured to enable only the first internal bridge for 10/100M linking, with the other repeater units' internal bridges configured for cascading.

20 Claims, 7 Drawing Sheets

US 6,396,841 B1

DUAL-SPEED STACKABLE REPEATER WITH INTERNAL BRIDGE FOR CASCADING OR SPEED-LINKING

FIELD OF THE INVENTION

This invention relates to computer networking equipment, and more particularly to stackable repeaters for dual-speed networks.

BACKGROUND OF THE INVENTION

Local-Area Networks (LAN's) using the Ethernet standard can be found in many offices today. The original 10 Mbps (10M) Ethernet standard has been extended to create the Fast Ethernet standard, operating at 100 Mbps (100M). While newly-installed network adapters usually can operate at 100M, much older equipment remains that still operates at the lower 10M speed. Thus mixed-speed networks are common as networks gradually replace older 10M equipment with 100M equipment.

To reduce the cost and ease the transition to higher-speed LAN's, dual-speed network equipment is available. Low-speed equipment can be connected to dual-speed network equipment and still operate at the lower 10M speed, while high-speed equipment operates at the higher 100M speed.

FIG. 1 shows a dual-speed network with an external network switch. Repeaters 10, 12, 14 are stackable repeaters that are stacked together. Two separate network busses 15, 17 connect repeaters 10, 12, 14. One network bus 15 operates at 10 Mbps, while the other network bus 17 operates at 100 Mbps. The network busses 15, 17 are stackable busses such as chassis backplane buses or stacking cables.

Repeaters 10, 12, 14 are dual-speed repeaters. Each repeater 10, 12, 14 contains two independent repeater circuits—one that operates at 10M, and the other operating at 100M. Ports operating at 10M connect only to the 10M-repeater circuitry and the 10M stacking network bus 15, while ports operating at 100M connect only to the 100M-repeater circuitry and the 100M stacking network bus 17.

Each repeater has four ports that connect to dual-speed 10/100M stations, 10M-only stations, or 100M-only stations. These are shown as stations $S_1$–$S_{10}$. Stations can be client machines, servers, gateways, and other network devices. Network-management software can set the speed of each repeater port to either 10M or 100M, or N-way auto-negotiation is used to sense the speed of the attached station and configure the port accordingly. N-way auto-negotiation is defined by the 100Base-T standard.

When any of the 10M stations connected to repeaters 10, 12, 14 send a packet, the data is repeated to all other ports on repeaters 10, 12, 14 that are also configured for 10M. Data is sent over the 10M stackable network bus 15 coupled to repeaters 10, 12, 14. Likewise, when any of the 100M stations connected to repeaters 10, 12, 14 send a packet, the data is repeated to all other ports on repeaters 10, 12, 14 that are also configured for 100M. However, data sent from a 10M port is not repeated to any of the 100M ports, and data sent from a 100M port is not repeated to any 10M port by the repeaters. Repeaters 10, 12, 14 essentially act as two independent, isolated networks, one at 10M, the other at 100M.

Data from the 10M network must be sent over a network bridge or switch to the 100M network since it is not directly transferred by repeaters 10, 12, 14. Network switch 16 connects to a port of repeater 10 that is configured for 10M operation. Network switch 16 also connects to a 100M-configured port of repeater 12. Network switch 16 stores incoming packets received from one side of the network and forwards (transmits) the stored packets to the other side of the network. Data cannot simply be repeated since the two sides of the network operate at different speeds. Entire packets are buffered.

Only one network switch or bridge can connect the 10M side of the network to the 100M side. If two bridges were connected between the same 10M and 100M sides, then a loop would occur. Data packets could be sent around endlessly in such as loop. A spanning-tree algorithm is sometimes used by network-management software to detect and break such loops.

Internal Bridges—FIGS. 2, 3

FIG. 2 shows an internal bridge for connecting 10M and 100M networks. Rather than using the ports of repeater 10, bridge 18 connects directly to stackable network busses 15, 17, the backplane buses of a stack of repeaters. Bridge 18 is a 2-port network switch that stores entire packets received from either bus 15 or bus 17, and re-transmits the packets to the other stackable network bus 17 or 15. Bridge 18 is contained within stackable-repeater unit 20 that includes repeater 10.

FIG. 3 shows an internal bridge connected to bridging ports of repeaters. Stackable repeater unit 22 contains repeaters 10, 12, and bridge 18. Stackable repeater unit 22 can be connected to other repeater units in a stack through stackable network busses 15, 17. Each repeater 10, 12 connects with up to four stations that are each configured for either 10M or 100M operation as described for FIG. 1. However, each repeater 10, 12 also contains an additional bridge port that connects to internal bridge 18. The bridge port on repeater 10 is configured for 10M operation, and is connected to 10M bus 15 by repeater 10, while the bridge port on repeater 12 is connected to 100M bus 17 by repeater 12.

Bridge 18 can be directly connected to repeaters 10, 12 using a digital connection. No long cables need to be driven, so large analog line drivers and receivers are not necessary as with bridge 18 of FIG. 2. Bridge 18 can be connected to repeaters 10, 12 at the controller level rather than the physical layer. This reduces cost.

While such an internal bridge is useful and more cost-effective than an external bridge, repeater units are no longer identical. Only one repeater unit in the stack with the internal bridge can be used; otherwise loops can occur. Other repeater units in the stack must not contain bridges. Having the repeater units in a stack be non-identical is problematic and causes confusion for network administrators and technicians. Simply disabling the bridge for the other repeater units is wasteful.

What is desired is a stackable repeater unit that can operate at two network speeds. A 10M/100M dual-speed repeater is desired. It is desired to have identical repeater units in a stack while still providing only one bridge between the 10M and 100M networks. It is desired to operate disabled bridges in repeater units for other useful purposes rather than simply disabling them to avoid looping.

SUMMARY OF THE INVENTION

A dual-speed stackable repeater unit has a first connection to a first stacking bus that operates at a first network speed and a second connection to a second stacking bus that operates at a second network speed. A plurality of ports connect to network stations. The plurality of ports include first ports operating at the first network speed and second ports operating at the second network speed.

An internal repeater is coupled to the first and second stacking buses by the first and second connections. It repeats data received from one of the first ports to all other first ports and to the first stacking bus, and it repeats data received from one of the second ports to all other second ports and to the second stacking bus.

An internal bridge is coupled to the first stacking bus and is coupled to the second stacking bus. It stores data packets from the first stacking bus and forwards the stored data packets to the second stacking bus. A buffered cascading port is coupled to the internal bridge. It receives data packets from an external repeater. The internal bridge forwards the packets to the first and second stacking buses.

A switch is coupled between the internal bridge and the second stacking bus. It disconnects the internal bridge from the second stacking bus when the repeater unit is configured as a cascading unit, but the switch connects the internal bridge to the second stacking bus when the repeater unit is configured as a linking unit.

The internal bridge in the repeater unit links the first stacking bus to the second stacking bus when the repeater unit is configured as a linking unit, but the internal bridge in the repeater unit does not link the first stacking bus to the second stacking bus when the repeater unit is configured as a cascading unit. Thus the internal bridge buffers packets from the external repeater on the buffered cascading port.

In further aspects of the invention exactly one repeater unit connected to the first and second stacking busses is configured as a linking unit, while all other repeater units connected to the first and second stacking busses are configured as a cascading units.

In other aspects multiple buffered cascading ports are coupled to external repeaters. Each of the multiple buffered cascading ports is coupled to the internal bridge. Thus multiple external repeaters are coupled to the internal bridge.

DETAILED DESCRIPTION

The present invention relates to an improvement in dual-speed network repeaters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realize that all repeater units in a stack should appear and function in an identical manner to simplify installation and network administration. The two sides of a 10M/100M dual-speed network should be connected together by one but only one bridge or switch. Additional bridges must be disabled to prevent loops.

The inventors have further realized that each repeater unit must contain a bridge, so all but one of the repeater units have disabled bridges. These disabled bridges should be employed for other useful purposes rather than left disabled.

The number of repeaters that can be cascaded together in a single collision domain is limited to 4 in a 10M network, but only 2 in a 100M network. Longer propagation paths could prevent collisions from being detected properly and reliably. This is a severe limitation, especially for the higher-speed 100M network.

The inventors realize that the disabled bridges can be used for cascading since they break up collision domains. Bridges store and forward packets rather than repeat data, so bridges isolate the two separate collision domains of repeaters attached to their ports. Bridges provide buffering so that the repeater limit of 2 or 4 is not reached as the network is expanded.

One of the internal bridges in a repeater stack is used for linking the 10M bus to the 100M bus. The other internal bridges that are not used for 10M/100M linking are available for cascading to other repeaters. The inventors provide a switch on one port of each internal bridge. One repeater unit's switch connects one internal bridge between the 10M and 100M bus, while the other repeater units have switches that connect the internal bridge to a cascading port. Repeaters plugged into cascading ports do not add to the repeater-limit count. The network can be greatly expanded by connecting external repeaters to the cascading ports.

Thus the inventors create identical repeater units, each with an internal bridge. Internal bridges not used for 10/100 linking are available for cascading. Since the internal bridges buffer the cascaded ports, the repeater limit is not reached. Unlimited cascading is available using the cascading bridge ports.

Figure 1:
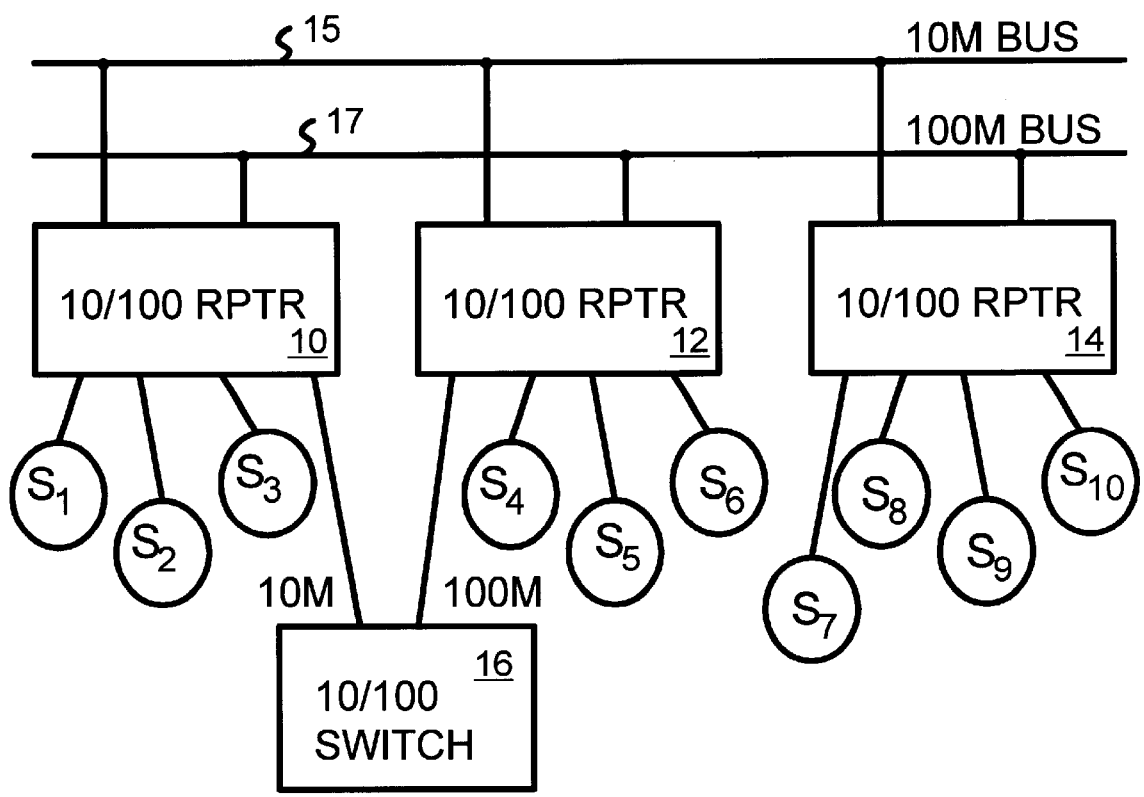
FIG. 1 shows a dual-speed network with an external network switch.
Figure 2:
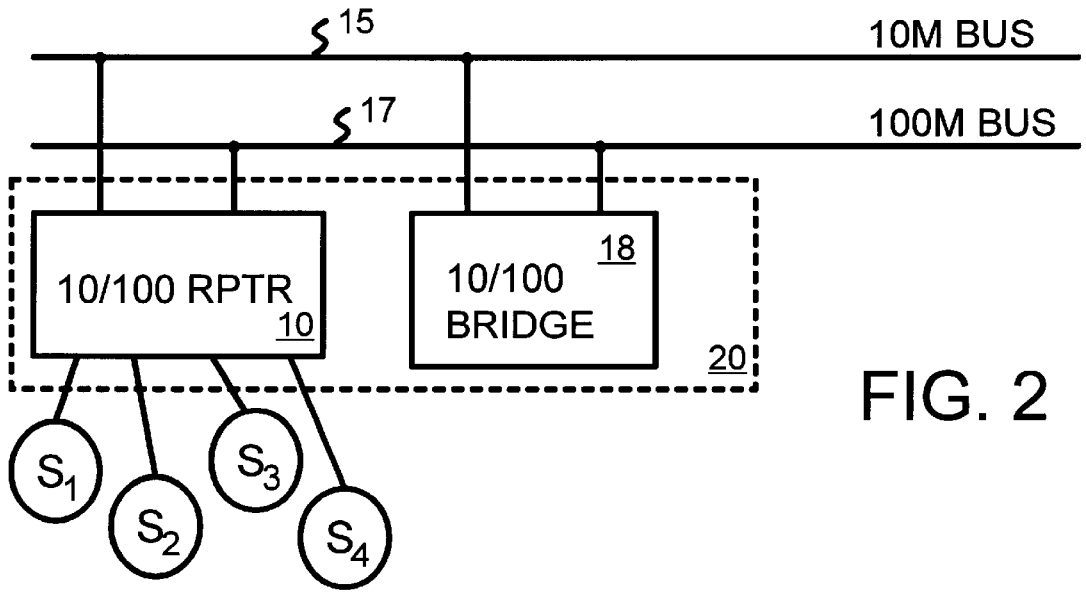
FIG. 2 shows an internal bridge for connecting 10M and 100M networks.
Figure 3:
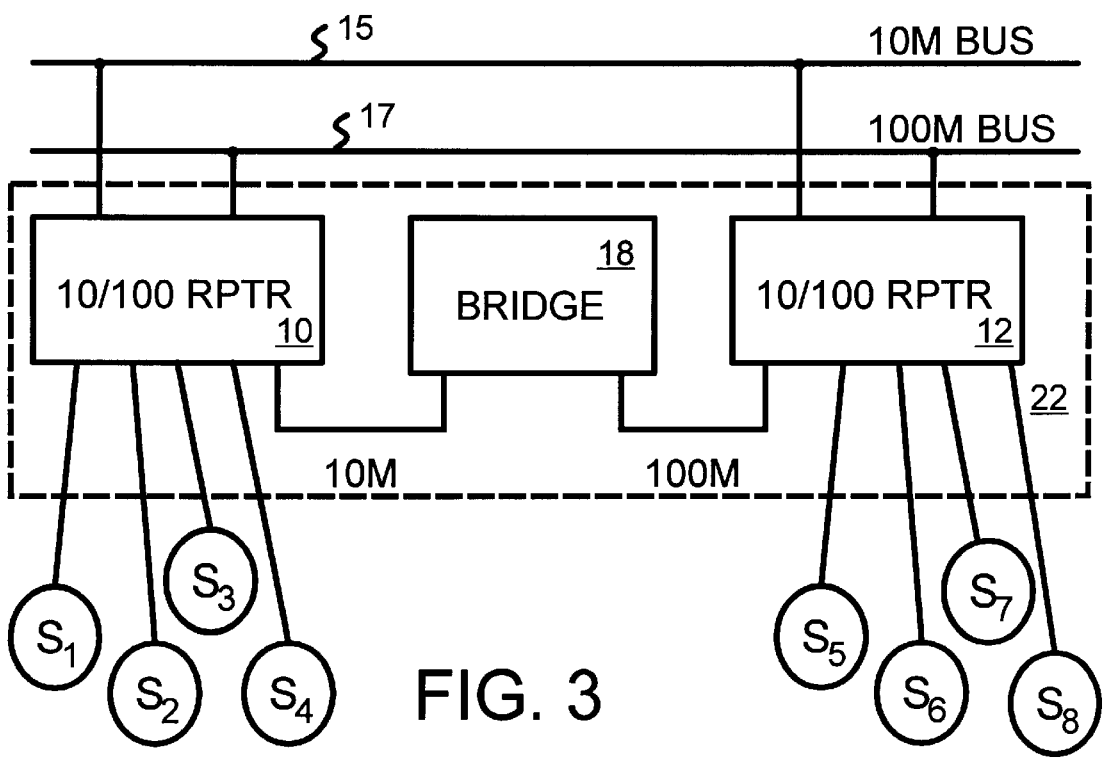
FIG. 3 shows an internal bridge connected to bridging ports of repeaters.
Figure 4:
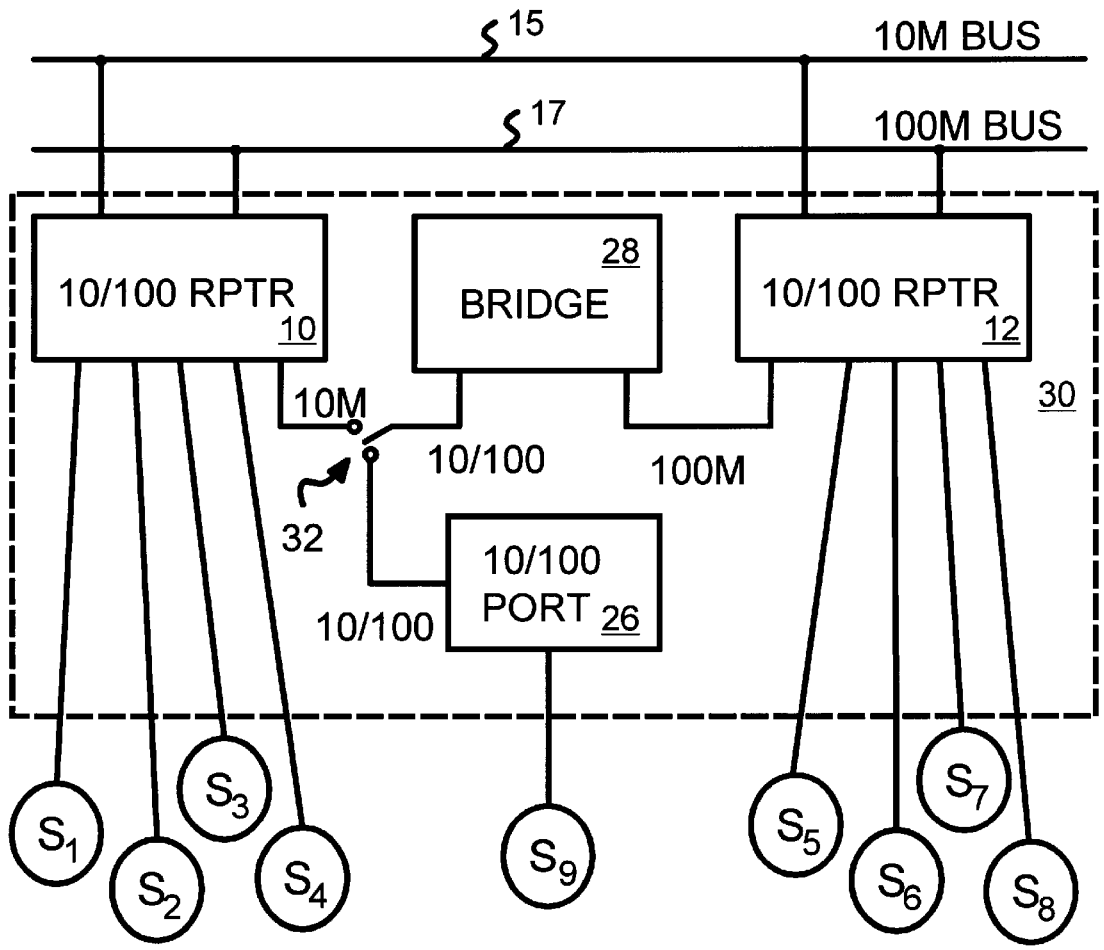
FIG. 4 is a diagram of a stackable repeater unit with an internal bridge that is switched for use as a 10/100 link or an external cascade port.

Repeater With Internal Link/Cascade Bridge—FIG. 4

FIG. 4 is a diagram of a stackable repeater unit with an internal bridge that is switched for use as a 10/100 link or an external cascade port. Repeater unit 30 is a stackable unit that can be connected with other stackable repeater units. Since all such stackable repeater units are connected together by stackable network busses 15, 17 rather than by traditional cascading, additional stacked repeaters do not count toward the cascading limit. All stackable repeater units can be identical to repeater unit 30.

Repeaters 10, 12 each connect to network busses 15, 17, and to four ports. Each repeater 10, 12 also has a bridge port for connecting to internal bridge 28. Repeaters 10, 12 each contain separate repeater circuitry—one for 10 Mbps operation and connected to 10M bus 15, and second for 100 Mbps operation and connected to 100M bus 17. Each of the four ports connected to stations $S_1$–$S_4$ is configured by software or by auto-negotiation for either 10M or 100M operation and is connected to either the 10M or 100M repeater circuitry. The same is true for repeater 12 and its ports connected to stations $S_5$–$S_8$.

Data is repeated from a transmitting 10M port to all other 10M ports on repeater 10, and then over 10M stacking network bus 15 to repeater 12, which repeats the data to all of its ports that are configured for 10M operation. The data is likewise repeated to all other stackable repeater units on bus 15. However, the data is not repeated to 100M ports. The data is repeated bit-by-bit rather than being stored and forwarded. The 100M ports of repeaters 10, 12 likewise form a separate, isolated network using 100M bus 17.

One of the repeater units 30 is configured as the linking unit, while all others are configured as cascading units. When switch 32 is in the up position, connecting repeater 10 to bridge 28, repeater unit 30 is configured as a linking unit. When switch 32 is in the down position, connecting cascading port 26 to bridge 28, repeater unit 30 is configured as a cascading unit.

The repeater unit 30 configured as the linking unit has switch 32 connect bridge 28 with a 10M bridge port on repeater 10. Bridge 28 also connects to a 100M bridge port on repeater 12. For the linking unit, bridge 28 acts as a linking bridge that converts 10M packets from repeater 10 to 100M packets to repeater 12. Packets can be stored from either repeater 10 or repeater 12 and forwarded to the other repeater 12, 10. Thus internal bridge 28 for the repeater unit 30 configured as the linking unit links the 10M and 100M networks together.

All of the other repeater units 30 are configured as cascading units. Switch 32 is then set to connect bridge 28 to cascading port 26. Bridge 28 does not then connect to repeater 10. Cascading port 26 can connect to either a 10M or a 100M station or external repeater. Either auto-negotiation or software configuration can be used to set the speed of cascading port 26. Bridge 28 stores and forwards packets from the 100M bridge port of repeater 12 to cascading port 26. Even when cascading port 26 is connected to a 10M station or repeater, its packets are converted to 100 Mbps packets by bridge 28 before being forwarded to repeater 12.

Cascading port 26 contains analog circuitry that converts the digital signals from bridge 28 to analog signals driven over a network cable to the external station or repeater. Signals such as data, clock, and control strobes are converted from digital to encoded analog signals such as NRZ signals that embed the clock with the data.

Switch 32 is shown as a mechanical switch, but is actually implemented as muxing logic. The muxing logic of switch 32 can be controlled by a DIP switch, or preferably, is controlled by an automatic-enabling circuitry shown later in FIG. 7.

Figure 5:
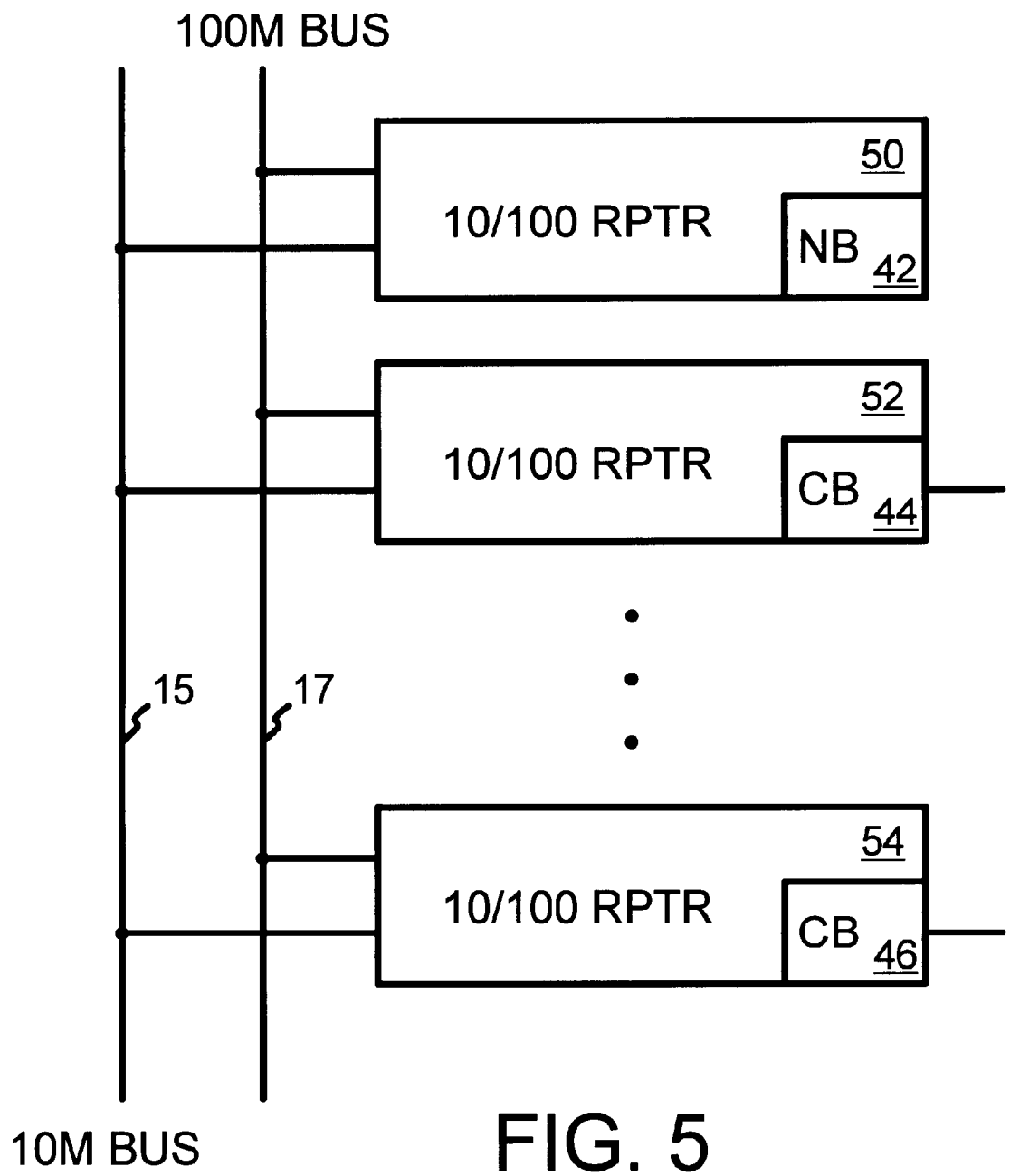
FIG. 5 is an example of a repeater stack with one 10/100M linking internal bridge and other internal bridges configured as cascading ports.

Repeater Stack With Linking Bridge and Cascading Bridges—FIG. 5

FIG. 5 is an example of a repeater stack with one 10/100M linking internal bridge and other internal bridges configured as cascading ports. Repeater units 50, 52, 54 each contain two or more repeaters and each contain an internal bridge. All repeaters have 10 Mbps circuits that connect any 10M ports to 10M stackable network bus 15, and 100 Mbps circuits that connect any 100M ports to 100M stackable network bus 17. Upper repeater unit 50 has its internal bridge configured as linking network bridge 42. Linking network bridge 42 connects a 10M port on one internal repeater to a 100M port on another internal repeater in repeater unit 50. The differences in network speeds are accounted for by storing the entire packet before transmitting it to the other network.

Other repeater units 52, 54 in the repeater stack are configured as cascading units. Internal bridges in repeater units 52, 54 are connected to just one internal repeater and to a cascading port. Thus the internal bridges act as cascading bridges 44, 46. The cascading ports attached to these internal bridges can be connected to external repeaters without regard to the repeater limit, since the internal bridge buffers packets, forming a boundary to each collision domain. Repeater units 50, 52, 54 are identical, and can be implemented as repeater unit 30 of FIG. 4. Likewise, bridges 42, 44, 46 are identical internal bridges such as bridge 28 of FIG. 4, just having switch 32 in a different position for linking network bridge 42 and cascading bridges 44, 46. The analog cascading port circuitry in upper repeater unit 50 is the only redundant circuitry that is not used.

Cascading bridges 44, 46 can connect to either 10M or 100M external repeaters. Auto-negotiation can be used to sense the speed of the external repeater.

Figure 6:
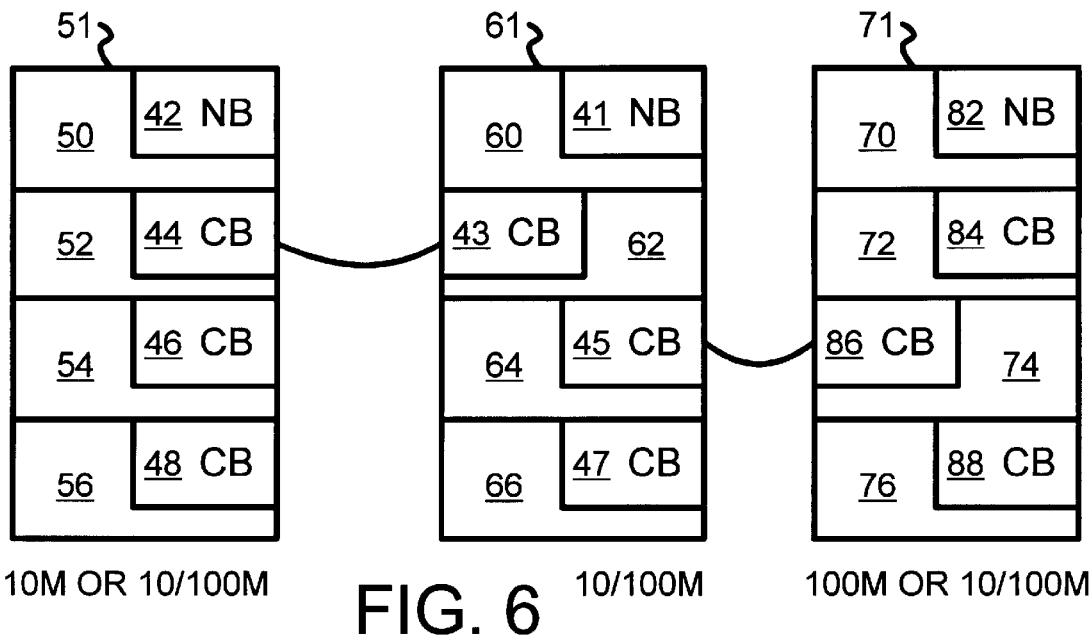
FIG. 6 illustrates three repeater stacks cascaded together using the cascading internal bridge.

Cascaded Repeater Stacks—FIG. 6

FIG. 6 illustrates three repeater stacks cascaded together using the cascading internal bridge. Repeater stack 61 is a dual-speed stack of stackable repeater units 60, 62, 64, 66, each an identical repeater unit that plugs into both a 10M and a 100M backplane network bus. Internal repeaters in all three stacks 51, 61, 71 are connected to many external stations (not shown).

Upper repeater unit 60 in stack 61 contains an internal bridge that is configured as a linking network bridge 41. Linking network bridge 41 connects the 10M backplane bus to the 100M backplane bus of stack 61 through internal repeater ports in repeater unit 60. Thus the 100M and 10M networks in stack 61 are connected together by exactly one bridge.

All other internal bridges in stack 61 are configured as cascading bridges. Cascading bridges 43, 45, 47 are identical to linking network bridge 41, except that the switch connects the cascading port to the bridge, rather than a second internal repeater's bridge port.

Repeater stacks 51, 71 are separate stacks with their own backplane busses. They both can be dual-speed stacks using the invention, in which case the upper repeater units 50, 70 have bridges configured as linking network bridges 42, 82. Other repeater units 52, 54, 56, 72, 74, 76 have internal bridges configured as cascading bridges 44, 46, 48, 84, 86, 88.

Repeater stacks 51, 71 can be pre-existing (prior-art) repeater stacks, such as dual-speed stacks or single-speed stacks. When linking bridges are not present in the other dual-speed stacks, a second cascading link (not shown) can be used so links are made to both 10M and 100M networks Cascading bridge 43 connects stack 61 with stack 51, with the cascading port configured for 10 Mbps. Cascading bridge 43 is shown as connected to cascading bridge 44. Cascading bridge 43 can also be connected to any port of repeater 52. Thus cascading bridges are not needed on stack 51, so older stacks can be used with the invention. Cascading bridge 45 connects stack 61 with stack 71, with the cascading port configured for 100 Mbps. Similarly, cascading bridge 45 can also be connected to any port of repeater 74.

Since cascading bridges 43, 45 buffer packets, the collision domain of stack 61 is isolated from the collision domain of stack 51, and from the collision domain stack 71. Unlimited cascading is possible using the buffered cascading ports, since the collision domain, with the limit of 2 or 4 cascaded repeaters, ends at the cascading bridge. Each separate collision domain can have 2 or 4 traditionally-cascaded repeaters.

Figure 7:
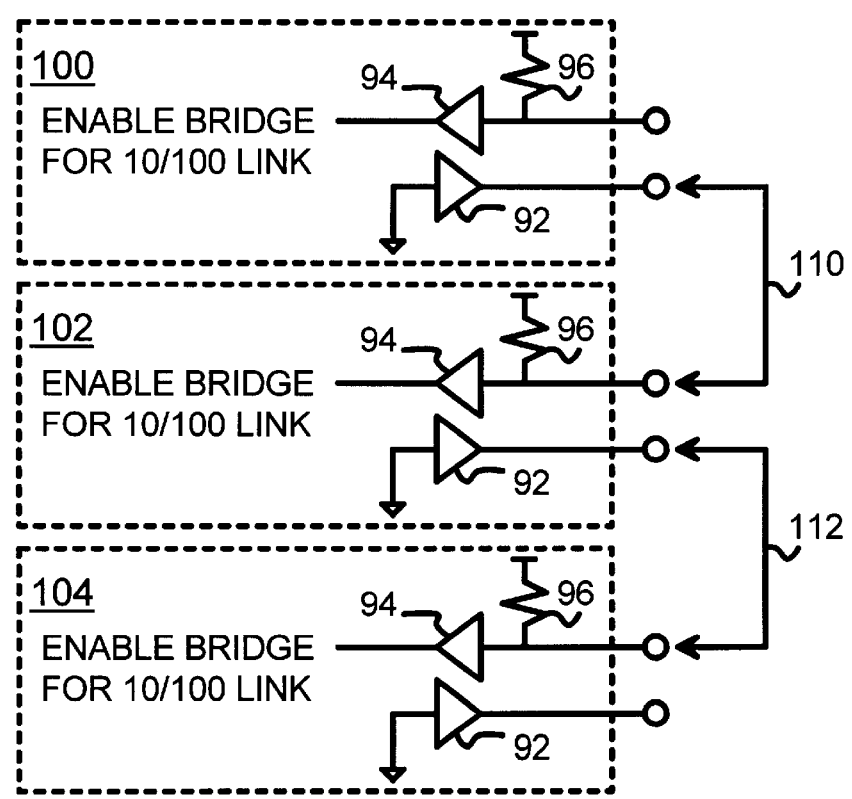
FIG. 7 is a schematic of an automatic configuration circuit for internal bridges in a repeater stack.

Automatic Configuration of Internal Bridges—FIG. 7

FIG. 7 is a schematic of an automatic configuration circuit for internal bridges in a repeater stack. Stackable repeater units 100, 102, 104 each include two or more internal repeaters and an internal bridge as shown in FIG. 4. Each stackable repeater unit 100, 102, 104 has input buffer 94 and output buffer 92 for automatic configuration. Pull-up resistors 96 pull up the configuration input when no external input is applied, causing input buffer 94 to activate its output, which enables the 10/100M linking bridge. The linking bridge function is enabled by switch 32 of FIG. 4 being in the up position.

When the output from input buffer 94 is low, the linking function is not enabled. Instead, the internal bridge is used as a cascading bridge. This corresponds to switch 32 of FIG. 4 being in the down position.

Stacking cables 110, 112, or lines in the chassis backplane, connect the output of a repeater unit with the input of the next-lower repeater unit in the stack. For example, cable 110 connects the output of repeater unit 100 with the input of repeater unit 102. Output buffer 92 has its input tied to ground, so it drives the input to repeater unit 102 low. Output buffer 92 is able to overcome the weak pull-up of pull-up resistor 96 so that input buffer 94 drives its enable low for repeater unit 102. This configures the internal bridge of repeater unit 102 as a cascading bridge. Likewise, cable 112 conducts the low from output buffer 92 of repeater unit 102 to the input of repeater unit 104, causing its input buffer 94 to drive the enable low. The low enable in repeater unit 104 causes the switch to connect the internal bridge to the cascading port. The internal bridges of repeater units 102, 104 thus function as cascading bridges.

The upper-most repeater unit 100 has no cable connected to its input. Thus resistor 96 causes its input buffer 94 to drive the enable high. The switch in upper repeater unit 100 then connects the bridge ports of the two internal repeaters to the internal bridge. A linking bridge is therefore configured for only upper repeater unit 100, while other repeater units 102, 104 are configured as cascading units.

Figure 8:
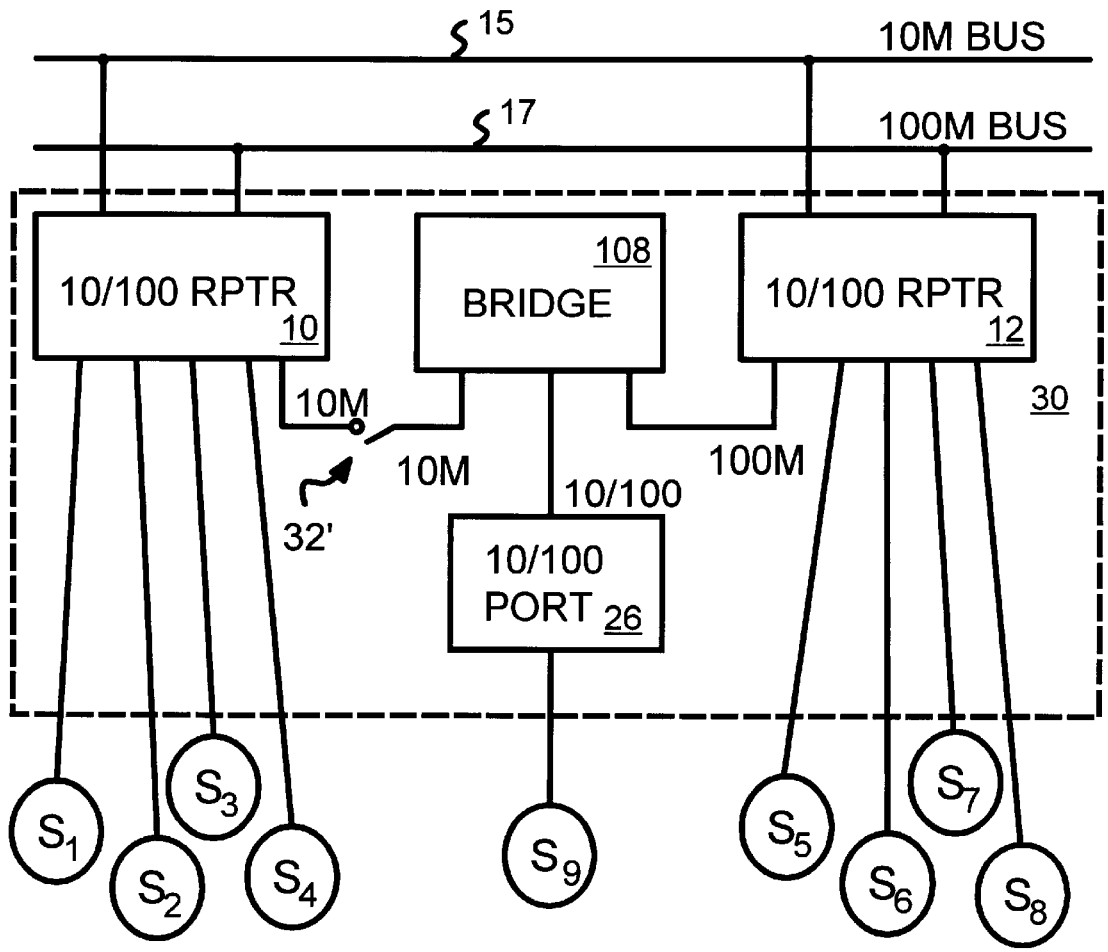
FIG. 8 shows an alternate embodiment that uses a multi-port internal bridge.
Figure 9:
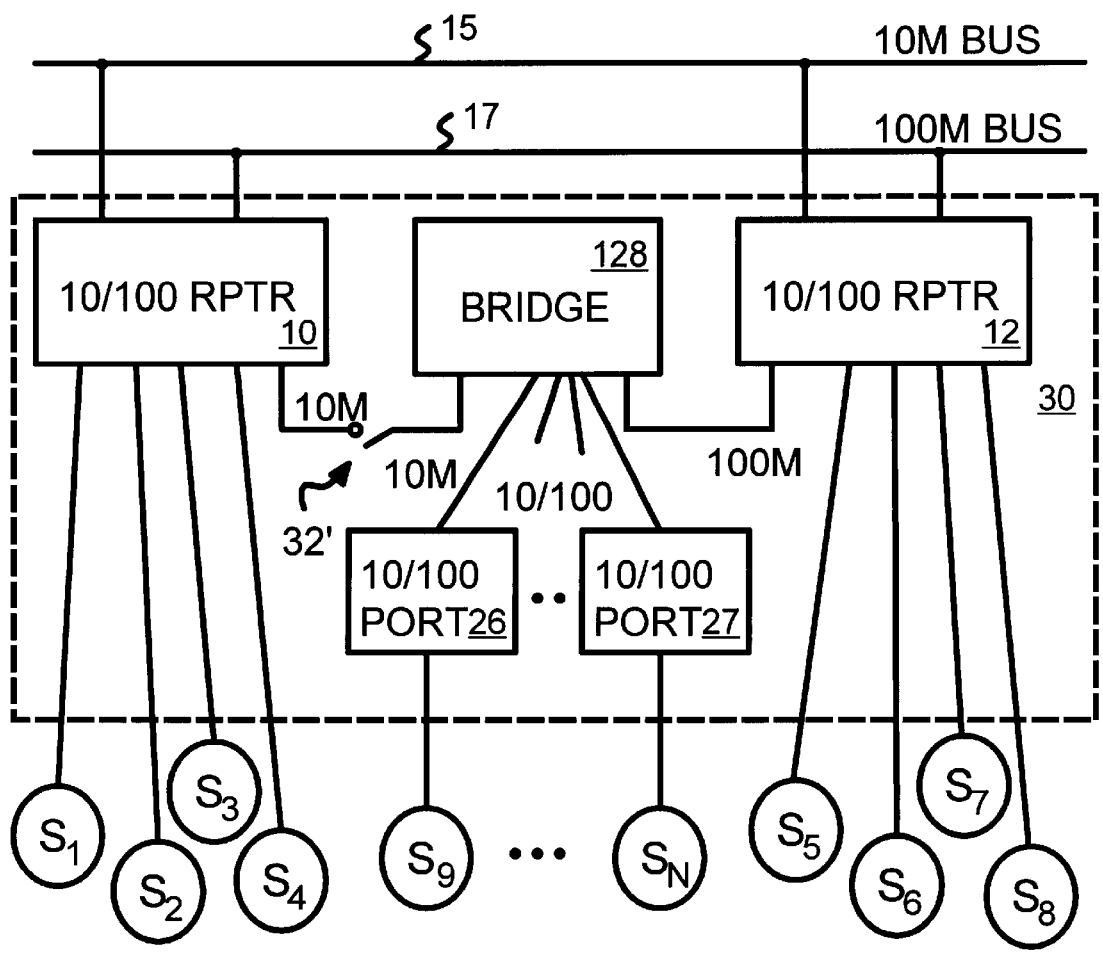
FIG. 9 shows a repeater unit with a multi-port internal bridge for multiple cascading ports.

Multi-Port Internal Bridge—FIGS. 8, 9

FIG. 8 shows an alternate embodiment that uses a multi-port internal bridge. Internal bridge 108 has three ports. One port is connected to a 100M port of repeater 12. Another port is connected through switch 32' to a 10M port of repeater 10. When switch 32' is closed, bridge 108 acts as a linking bridge, converting 10M packets from repeater 10 to 100M packets that are forwarded to repeater 12. When switch 32' is open, bridge 108 cannot act as a linking bridge.

A third port of bridge 108 is connected to cascading port 26. Cascading port 26 can connect to either a 10M or a 100M external repeater or station. Packets from the external repeater are converted to digital signals by cascading port 26 and stored by bridge 108 before being forwarded to repeater 12 at 100 Mbps and to repeater 10 at 10 Mbps if switch 32' is closed. Bridge 108 converts these packets to 100M format before transmitting them to repeater 12.

Since bridge 108 has three ports, cascading port 26 is always connected to repeater 12. This has the advantage that the upper repeater unit that is configured for 10/100M linking by closing switch 32' can still have an external repeater plugged into its cascading port, just like the other repeater units 30 with switch 32' open. The cascading bridge is permanently enabled for all repeater units in the stack, while the linking network bridge is disabled for all but the upper-most repeater unit in the stack.

Bridge 108 sends all packets from one port to all the other ports. All packets from cascading port 26 are sent at 100 Mbps to repeater 12 and at 10 Mbps to repeater 10, and all packets from the 10M port of repeater 10 are sent to repeater 12 and to cascading port 26. Packets from repeater 12 are sent to both cascading port 26 and to repeater 10.

While bridge 108 can operate in a broadcast mode, copying packets to all other ports, bridge 108 can also operate in a point-to-point mode. Bridge 108 can send packets from one port to a specific destination port. Each packet contains a source address and a destination address. As packets are exchanged in the network, bridge 108 sets up an address table. The address table indicates which stations are reached through which ports of the bridge. Thus, once the address table is built up, the bridge can determine whether to forward the packet or not. A packet does not have to be forwarded if the source station and the destination station both are reached through the same port. The bridge determine by a look up of the address table when the destination station belongs to a different port.

FIG. 9 shows a repeater unit with a multi-port internal bridge for multiple cascading ports. Bridge 128 has multiple cascading ports that are connected to cascading ports 26, 27 and others not shown. External repeaters can be connected to cascading ports 26, 27, or external stations $S_9$–$S_N$. Switch 32' connects repeater 10 to bridge 128 when repeater unit 30 is configured as the linking network bridge in a stack; otherwise switch 32' is open.

Multiple cascading ports 26, 27 are permanently available for connecting to external repeaters in this embodiment. All packets from external cascading ports 26, 27 are stored by bridge 128 and forwarded to repeater 12 at 100 Mbps, and to repeater 10 at 10 Mbps if switch 32' is closed. Packets from repeater 12 are sent to all cascading ports 26, 27, and to repeater 10 if switch 32' is closed. Packets received from one cascading port 26 are stored by bridge 128 and then forwarded to all other cascading ports 27.

ADVANTAGES OF THE INVENTION

A stackable repeater unit can operate at two network speeds. A 10M/100M dual-speed repeater unit is described. Identical repeater units exist in a stack while only one bridge is enabled between the 10M and 100M networks. Disabled bridges in repeater units are operated for other useful purposes such as buffered cascading rather than simply being disabled to avoid looping. The same internal bridge can be used for both linking and cascading. The bridge itself does not have to be modified; only the switch on one output needs to be added.

Redundant hardware is eliminated, since internal bridges not used for 10/100M linking are used for cascading. Virtually unlimited cascading is possible with the bridge-buffered cascading ports, since buffering by the internal bridge splits the network into separate collision domains. Cost can be reduced since additional buffers are not required. Uniform repeater units can be manufactured, simplifying manufacture, installation, and administration.

Having identical repeater units is quite important because it eases installation and maintenance (administration). Repeaters using the invention can also operate in the same manner as the legacy (older) equipment. Familiar concepts such as stacking and cascading are retained. The invention's repeaters simplify the co-existence of 10M and 100M equipment, and ease the transition of the network from 10M to 100M.

ALTERNATE EMBODIMENTS

Several other embodiments are contemplated by the inventors. For example many circuit implementations are possible. The digital interface between the internal bridge and the cascading port, and between the internal bridge and the internal repeater's bridge port can use the media-independent interface (MII) defined in the 100Base-T standard. The internal bridge can be directly coupled to the 10M and 100M stackable network busses rather than connected through the internal repeaters. The 10M and 100M ports of the internal bridge can connect to the same internal repeater rather than to two separate internal repeaters as described.

Other network speeds can be used, such as for a 1 Gbps (1000 Mbps) network. The repeater unit can be for an N-speed network rather than just a dual-speed network. At least an N-port bridge is used, with one port for each network speed. For example, a tri-speed repeater unit has an internal bridge with 10M, 100M, and 1G ports. Only one of the N-port internal bridges is enabled in the repeater stack.

The switch and bridge can be integrated together with the repeaters, or separate chips used. Likewise, the analog circuitry of the cascading port interface can be integrated with the bridge and repeater units. While the term "stack" and "upper" have been used, it is apparent that the repeater units can be coupled together in many physical configurations other than a vertical stack.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A dual-speed stackable repeater unit comprising:
    a first connection to a first stacking bus that operates at a first network speed;
    a second connection to a second stacking bus that operates at a second network speed;
    a plurality of ports for connecting to network stations, the plurality of ports including first ports operating at the first network speed and second ports operating at the second network speed;
    an internal repeater, coupled to the first and second stacking buses by the first and second connections, for repeating data received from one of the first ports to all other first ports and to the first stacking bus, and for repeating data received from one of the second ports to all other second ports and to the second stacking bus;
    an internal bridge, coupled to the first stacking bus and coupled to the second stacking bus, for storing data packets from the first stacking bus and forwarding the stored data packets to the second stacking bus;
    a buffered cascading port, coupled to the internal bridge, for receiving data packets from an external repeater, the internal bridge forwarding the packets to the first and second stacking buses; and
    a switch, coupled between the internal bridge and the second stacking bus, for disconnecting the internal bridge from the second stacking bus when the repeater unit is configured as a cascading unit, but for connecting the internal bridge to the second stacking bus when the repeater unit is configured as a linking unit,
    wherein the internal bridge in the repeater unit links the first stacking bus to the second stacking bus when the repeater unit is configured as a linking unit, but the internal bridge in the repeater unit not linking the first stacking bus to the second stacking bus when the repeater unit is configured as a cascading unit,
    whereby the internal bridge buffers packets from the external repeater on the buffered cascading port.

2. The dual-speed stackable repeater unit of claim 1 wherein exactly one repeater unit connected to the first and second stacking busses is configured as a linking unit, while all other repeater units connected to the first and second stacking busses are configured as a cascading units.

3. The dual-speed stackable repeater unit of claim 2 wherein the buffered cascading port is coupled to the internal bridge through the switch, the switch connecting the buffered cascading port to the internal bridge when the repeater unit is configured as a cascading unit, but the switch connecting the second stacking bus but not the buffered cascading port to the internal bridge when the repeater unit is configured as the linking unit,
    whereby the buffered cascading port is disabled when the repeater unit is configured as the linking unit.

4. The dual-speed stackable repeater unit of claim 2 further comprising:
    multiple buffered cascading ports, for coupling to external repeaters, each of the multiple buffered cascading ports coupled to the internal bridge,
    whereby multiple external repeaters are coupled to the internal bridge.

5. The dual-speed stackable repeater unit of claim 2 wherein the buffered cascading port can operate at the first network speed or at the second network speed.

6. The dual-speed stackable repeater unit of claim 2 wherein the buffered cascading port is directly coupled to the internal bridge, bypassing the switch,
    whereby the buffered cascading port is enabled when the repeater unit is configured as the linking unit and when the repeater unit is configured as the cascading unit.

7. The dual-speed stackable repeater unit of claim 2 wherein the internal repeater further comprises:
    a first bridge port operating at the first network speed; and
    a second bridge port operating at the second network speed;
    wherein data received from the first bridge port is repeated to all first ports and to the first stacking bus;
    wherein data received from the second bridge port is repeated to all second ports and to the second stacking bus;
    whereby the internal bridge is coupled to the first stacking bus through the first bridge port of the internal repeater.

8. The dual-speed stackable repeater unit of claim 7 wherein the internal repeater comprises a first internal repeater containing the first bridge port and a second internal repeater containing the second bridge port.

9. The dual-speed stackable repeater unit of claim 2 wherein each port in the plurality of ports is configured as a first port or as a second port by auto-negotiation for the first or second network speed with a remote network station attached to each port,
    whereby repeater ports are dual-speed ports.

10. A repeater stack comprising:
    a first stacking bus operating at a first network speed;
    a second stacking bus operating at a second network speed;

a plurality of repeater units coupled to the first and second stacking buses, each repeater unit in the plurality of repeater units comprising:

a first internal repeater having ports for connecting to remote network stations operating at the first or the second network speeds, the first internal repeater repeating data received from a port operating at the first network speed to all other ports operating at the first network speed and to the first stacking bus, the first internal repeater repeating data received from a port operating at the second network speed to all other ports operating at the second network speed and to the second stacking bus;

a second internal repeater having ports for connecting to remote network stations operating at the first or the second network speeds, the second internal repeater repeating data received from a port operating at the first network speed to all other ports operating at the first network speed and to the first stacking bus, the second internal repeater repeating data received from a port operating at the second network speed to all other ports operating at the second network speed and to the second stacking bus;

an internal bridge, coupled to a port of the first internal repeater operating at the first network speed, for storing entire packets of data and for re-transmitting stored packets at a same or a different network speed;

a cascading port for connecting to an external repeater; and a switch, coupled to the internal bridge, the cascading port, and to a port of the second internal repeater operating at the second network speed, the switch connecting the internal bridge to the second internal repeater when configured for linking the first and second stacking busses, but the switch connecting the internal bridge to the cascading port when configured for cascading;

wherein a primary repeater unit has the switch configured for linking, the internal bridge of the primary repeater unit storing and re-transmitting packets between the first repeater at the first network speed and the second repeater at the second network speed;

wherein cascading repeater units have the switch configured for cascading, the internal bridge of a cascading repeater unit buffering packets from the cascading port, whereby internal bridges in the repeater units are used for linking and for cascading.

11. The repeater stack of claim 10 wherein the primary repeater unit is identical to the cascading repeater units, whereby the switch configures identical units for linking or for cascading.

12. The repeater stack of claim 11 wherein the repeater stack contains exactly one primary repeater, whereby network loops are avoided.

13. The repeater stack of claim 12 wherein the external repeaters are each in separate collision domains, wherein the internal bridges buffer a collision domain of the first repeaters and the first stacking bus from external collision domains of external repeaters connected to the cascading ports, whereby the repeater stack does not count toward a repeater limit of collision domains of external repeaters coupled to the cascading ports.

14. The repeater stack of claim 13 wherein the first network speed is 100 Mbps and the second network speed is 10 Mbps.

15. The repeater stack of claim 13 wherein the first and second repeaters repeat data bits to other ports as data bits are received, but the internal bridges wait for an entire data packet of data bits is received and stored before re-transmitting the data packet.

16. The repeater stack of claim 13 wherein the cascading port operates at either the first network speed or at the second network speed, whereby the cascading port is a dual-speed port.

17. The repeater stack of claim 13 wherein the switch comprises multiplexers configured by a mechanical switch.

18. The repeater stack of claim 17 further comprising:

auto-configuration means, coupled to the switch in each repeater unit, for configuring one repeater unit as the primary repeater unit and for configuring all other repeater units as cascading repeater units, whereby the switches are auto-configured.

19. The repeater stack of claim 13 wherein the cascading port converts analog signals from the external repeater to digital signals to the internal bridge and wherein ports of the first and second internal repeaters convert analog signals from external network stations to digital signals, but the first and second i internal repeaters send and receive digital signals to the internal bridge.

20. A stackable repeater unit comprising:

first bus means for communicating data bits to and from other stackable repeater units at a first network speed;

second bus means for communicating data bits to and from other stackable repeater units at a second network speed;

a plurality of dual-speed ports for connecting to external network stations operating at the first network speed or operating at the second network speed;

repeater means, coupled to the dual-speed ports and coupled to the first bus means and to the second bus means, for repeating data bits received at the first network speed to the first bus means and to all dual-speed ports configured for operating at the first network speed, and for repeating data bits received at the second network speed to the second bus means and to all dual-speed ports configured for operating at the second network speed;

first bridge-port means, on the repeater means, for sending and receiving data bits at the first network speed;

second bridge-port means, on the repeater means, for sending and receiving data bits at the second network speed;

bridge means, permanently coupled to the second bridge-port means and switchably connected to the first bridge-port means, for storing packets from the first bridge-port means containing a plurality of the data bits sent at the first network speed and transmitting stored packets of the data bits to the second bridge-port means at the second network speed;

cascading port means, for coupling to an external repeater not in a same stack as the stackable repeater unit; and switch means, coupled between the bridge means and the first bridge-port means, for connecting the first bridge-port means to the bridge means when the stackable repeater unit is configured for linking the first bus means to the second bus means, but for connecting the cascading port means to the bridge means when the stackable repeater unit is not configured for linking, whereby the stackable repeater unit is configured for linking or for the buffering the cascading port means.

* * * * *